United States Patent [19]

Yaniv

[11] Patent Number: 5,645,637
[45] Date of Patent: Jul. 8, 1997

[54] FOAMED MAGNESITE CEMENT AND ARTICLES MADE THEREWITH

[75] Inventor: Itzhak Yaniv, Beer-Sheva, Israel

[73] Assignee: Baran Advanced Materials 94 Ltd., Haifa, Israel

[21] Appl. No.: 450,490

[22] Filed: May 26, 1995

Related U.S. Application Data

[63] Continuation-in-part of Ser. No. 331,377, Oct. 28, 1994, abandoned.

[30] Foreign Application Priority Data

May 30, 1994 [IL] Israel .................................. 109825
Sep. 22, 1994 [IL] Israel .................................. 111031

[51] Int. Cl.$^6$ .................................................. C04B 9/00
[52] U.S. Cl. .................... 106/677; 106/685; 106/686; 106/689; 106/802; 252/62; 119/171; 428/920; 428/921; 502/400
[58] Field of Search .................... 126/677, 685, 126/686, 689, 802; 252/62; 428/920, 921; 119/171; 502/400

[56] References Cited

U.S. PATENT DOCUMENTS

| | | | |
|---|---|---|---|
| 2,702,753 | 2/1955 | Dickey | 106/686 |
| 3,969,453 | 7/1976 | Thompson | 264/42 |
| 4,041,929 | 8/1977 | Cooksey | 126/120 |
| 4,123,392 | 10/1978 | Hall et al. | 106/640 |
| 4,174,420 | 11/1979 | Anolick et al. | 428/310 |
| 4,335,788 | 6/1982 | Murphey et al. | |
| 4,339,274 | 7/1982 | Duyster et al. | |
| 4,699,822 | 10/1987 | Shu | 428/198 |
| 4,786,328 | 11/1988 | Weill et al. | |
| 4,814,014 | 3/1989 | Arfaei | 106/727 |
| 4,922,481 | 5/1990 | von Bonin et al. | 521/54 |
| 4,992,481 | 2/1991 | von Bonin | 521/54 |
| 5,264,017 | 11/1993 | Van de Walle | |

FOREIGN PATENT DOCUMENTS

| | | |
|---|---|---|
| 1339275 | of 1973 | Brazil . |
| 1486870 | of 1977 | Brazil . |
| 1992 | 5/1979 | European Pat. Off. . |
| 0045162A1 | of 1982 | European Pat. Off. . |
| 0082910A1 | of 1983 | European Pat. Off. . |
| 0241103B1 | of 1987 | European Pat. Off. . |
| 454660 | 10/1991 | European Pat. Off. . |
| 2134722 | of 1973 | Germany . |
| 2140618 | of 1973 | Germany . |
| 2207299 | of 1974 | Germany . |
| 2264835 | of 1975 | Germany . |
| 2350996 | of 1975 | Germany . |
| 2532581 | of 1976 | Germany . |
| 2922815 | of 1978 | Germany . |
| 2810180 | 9/1979 | Germany . |
| 145015 | 11/1980 | Germany . |
| 3031086A1 | of 1982 | Germany . |
| 3230962A1 | of 1984 | Germany . |
| 3340949A1 | of 1984 | Germany . |
| 3506555A1 | of 1986 | Germany . |
| 55-140747 | 5/1980 | Japan . |
| 58-208159 | 12/1983 | Japan . |
| 1590384 | 3/1981 | United Kingdom . |
| 87/04145 | of 1987 | WIPO . |
| 89/02422 | of 1989 | WIPO . |
| 90/11976 | of 1990 | WIPO . |
| WO91/09093 | 6/1991 | WIPO . |
| 92/17414 | of 1992 | WIPO . |
| 92/18473 | of 1992 | WIPO . |

OTHER PUBLICATIONS

Rossiter et al., *Insulation Materials Testing and Applications* (McElroy and Kimpflen, eds., Philadelphia (1990) 38–51.
Beaudoin et al., *Am. Cer. Soc. Bull.*, 56(4), 424–7 (1977).
Seki, JP55140747 (May 11, 1980), "Water Resistant Magnesia Cement Composition—includes phosphoric acid or alkali phosphate carboxylic acid and alkali carboxylate" (see abstract (Derwent)).
Ved et al., *Budivelni Mater. Konstr.*, (1), 35–6 (1969).
Stanboliev et al., *Tonindustrie Zeitung*, 100(1), 34–37 (1976).

*Primary Examiner*—Paul Marcantoni
*Attorney, Agent, or Firm*—Mark M. Friedman

[57] ABSTRACT

Foamable magnesite cement, comprising a cement selected from magnesium oxychloride and magnesium oxysulphate cement, or a mixture thereof, together with one or more organic carboxylic acid(s) having a foaming coefficient lower than 1.80, and/or their anhydride(s) and/or their salt(s).

41 Claims, No Drawings

FOAMED MAGNESITE CEMENT AND ARTICLES MADE THEREWITH

This application is a continuation in part of Ser. No. 08/331,377, filed Oct. 28, 1994, abandoned.

FIELD OF THE INVENTION

This invention relates to articles made from improved foamed magnesite cements and to a process for their preparation by mixing MgO, $MgCl_2$ and/or $MgSO_4$, water and certain organic carboxylic acids and/or their anhydrides and/or their salts that are able to foam these cements. These cements are characterized by their improved physical and chemical properties and by the low cost of their production.

The invention also relates to the use of such cements in the hardened form as construction elements, materials for packaging, adsorbents (e.g. ions, inorganic and organic materials), fillers and flame retardants in plastics and composite materials for special applications and for sound and heat insulators.

BACKGROUND OF THE INVENTION

Magnesite Cements

The magnesite cements, referred to hereinafter, include magnesium oxychloride cements, having a composition defined by $nMgO.MgCl_2.mH_2O$. The art deals with compositions in which n=3 and m=1, or in which m=5 and n=13, or the like. The present invention is not limited to a specific composition and includes any cement the composition of which comprises MgO and $MgCl_2$, and generally molecular water. The magnesite cements also include oxysulfate cements, the composition of which can be described by the formula $m'MgO.MgSO_4.n'H_2O$. Various possible values of n' and m' are known in the art, e.g. n'=5 and m'=3. The expression "magnesite cements" also includes mixtures of oxychloride and oxysulfate cements.

Obviously, the structure and compositions of the cements change during the curing or hardening process, in manners that are well known to skilled persons and are discussed in the literature. Whenever magnesium cements are mentioned in this specification and claims, it is understood that reference is made to cured or uncured or both to cured and uncured cements, as appropriate in each case.

In the specification and claims, the expression "magnesite cement" is intended to include both magnesium oxychloride or Sorel cement, magnesium oxysulfate cement, and mixtures thereof.

It should be noted that magnesite cements are not hydraulic cements, like e.g. Portland cements, as they deteriorate on being soaked in water, while the latter tend to harden under similar conditions. Another difference between the cements mentioned above is the fact that the aqueous solutions that are used to prepare the magnesite cements contains high concentrations of salts ($MgCl_2$ and/or $MgSO_4$), while the aqueous solution that are used in the preparation of e.g. Portland cement contain low concentrations of salts. These facts, and the fact that the magnesite cements are basically composed of $Mg^{++}$ cations, while the Portland cement should not contain such ions in any considerable amount, have a bearing on the chemical and physical properties of these different cements and therefore on the technologies of their preparation and their uses. Namely, an improvement in one type of cement is not necessarily suitable for the other.

U.S. Pat. No. 2,702,753 reviews critically the state-of-art, at that time, to form porous magnesite cements (incorporation into cementitious materials proper fillers or aggregates which are either of lighter specific gravity or in effect are rendered so by being of porous character; including in the cementitious mixtures chemical ingredients which will react to generate gases; operation under pressure substantially higher or lower than atmospheric). U.S. Pat. No. 2,702,753 discloses a method to produce foamed magnesite cements by merely mixing MgO, $MgCl_2$ and/or $MgSO_4$, water and wetting or foaming agents, using simple mixers. This patent discloses that various such wetting agents, known and available for other purposes, may be used to obtain the foamed magnesite cements. Only the general chemical structures of the foaming agents, which reduce surface tension when added to water or watery mixtures, are given.

The alleged potential of this promising technology, which is revealed in U.S. Pat. No. 2,702,753, has not yet materialized on large scale operations for the reason that it is not so effective as claimed. That can be deduced from the ensuing art and from the experimental results shown hereinafter.

The method to produce foamed magnesite cements is described in "Magnesium Oxychloride-Based Foam Thermal Insulation: An Initial Investigation"; W. J. Rossiter, Jr. et al; in "Insulation Materials, Testing, and Applications"; D. L. McElroy et al; ASTM; Philadelphia; 1990; pages 38–51. Though the procedure of producing the foamed magnesite cements makes use of foaming agents (cf page 39), but it does not make use of simple agitation devices, as diclosed in U.S. Pat. No. 2,702,753. The technology that is described in this reference to produce the foamed magnesite cements is much more expensive than simple mixing (with respect to the cost of the devices, operation and maintainance costs and much lower throughputs).

In another later U.S. Pat. No. 4,041,929 the technology of producing foamed magnesium oxychloride cements is diclosed. This procedure makes use of frothing agent— "Norgan Expander" which is actually Mg metal plus lactic acid that react, In Situ, during the production of the magnesite cement to form a dengerous gas (Hydrogen), that froths the mixture. Organic resins, including polyacrylic acids, which are added to the formulation of the cements, do not appear to play a role in causing foaming. On the contrary, the use of the frothing agent in this patent indicates that the organic resins did not foam the cement. The experimental section of the present patent application will reveal that indeed polyacrylic acids do not foam the magnesite cements to any practical extent, when it is prepared using simple industrial mixers.

U.S. Pat. No. 4,699,822 differentiate between magnesite cements and hydraulic cements (cf col.6; lines 32–38). It descibes the various ingredients that are being used to produce foamed cements (cf col. 7; lines 1–4). From this description it is clear that acrylic latex and acrylic powders do not cause any substantial and practical foaming of the magnesite cements, and air entraining agents are used therein.

U.S. Pat. No. 4,992,481 discloses the use of polycarboxylic acids and their salts (cf col. 6; lines 15,16), among many other organic polymeric materials, in the production of magnesite cements, but there is no disclosure of any kind that these materials cause foaming. Indeed, there is no basis for that, as will be demonstrated in the experimental section of the present patent application.

U.S. Pat. No. 4,814,014 discloses the use of graft copolymers of polyether backbones and side chains prepared by polymerization of an ethylenically unsaturated monomers, including acrylic acid and similar compounds. Once again, there is no indication that these materials cause foaming or frothing of the cements. U.S. Pat. No. 4,814.014 teaches that only polymeric moieties are involved in the production of the cements.

Magnesite cements are known to deteriorate in water. Numerous patents and papers describe this phenomenon and suggest of how to solve this problem that limits the use of magnesite cements (foamed and unfoamed). The following discussion will demonstrate some of the solutions that have been suggested in the literature:

U.S. Pat. No. 5,004,505 discloses magnesium oxychloride cement compositions and products obtained by mixing magnesium oxide, a magnesium chloride solution, a strong acid and aggregate particles. The resulting products are said to exhibit increased strength and water resistance. The references cited in the said patent are illustrative of the state of the art.

The addition of phosphoric acid and metal phosphates to improve the properties of the magnesite cements is mentioned, for example, in E. I. Ved et al: "Water-resistant magnesia cement based on caustic dolomite"; Budirelni Mater. Konstr. (1) 35–6 (1969) (also C.A. 103399C Vol. 72 (1970)), H. T. Stamboliev: "Magnesia-Zement—Verbesserung der wasser-bestandigkeit durch phosphatzusatz..."; Tonind. - Ztg. 100 (1976) Nr. 1. pp. 34–37, and Israeli Patent No. 81807.

The use of sulphur to improve the magnesite cements is reported in J. J. Beaudoin et al "Impregnation of magnesium oxychloride cement with sulphur": Ceramic Bull. Vol. 56, No. 4 (1977), pp 424–7.

EPA 454660 discloses and claims a Sorel cement, said to have improved water resistance, based on mixtures of MgO, $MgCl_2$ and inorganic fillers, characterized in that it contains water soluble, polymeric or polycondensed synthetic resins, including water soluble polycarboxylic acids. This patent, also, does not mention any foaming or frothing of the magnesite cements during their production.

DE 3832-287 discloses the use of citric acid and oxalic acids to improve the water resistance of magnesite cements. The possibility that these reagents also lead to foaming of the magnesite cements have not been suggested by this reference. Indeed, as will be demonstrated in the experimental of the present patent application, these agents do not substantially cause foaming of the cement.

As is clear from the above discussion, none of the teachings of the prior art is fully satisfactory, from the viewpoint of water resistance and simplicity of operation and flexibility in formulating objects made from foamed magnesite cements of varied densities and cost effectiveness.

We have found out that articles can be made from improved foamed magnesite cements, which are obtained by mixing MgO, $MgCl_2$ and/or $MgSO_4$, water and certain organic carboxylic acids and/or their anhydrides and/or their salts that are able to foam these cements. These cements are characterized by their improved physical and chemical properties and by the low cost of their production. The articles made of this improved foamed cements, in the hardened forms, can be used as construction elements, materials for packaging, adsorbents (e.g. ions, inorganic and organic materials), fillers and flame retardants in plastics and composite materials for special applications and for sound and heat insulators.

It is a purpose of the present invention to provide an inexpensive magnesite cement having improved physical and chemical properties which forms foamed bodies.

It is a further purpose of the invention to provide such cement mixtures, which can be produced by utilizing readily available and inexpensive raw materials and simple mixing devices.

Other purposes and advantages of the invention will appear as the description proceeds.

SUMMARY OF THE INVENTION

Surprisingly, it was found that mixing certain organic monocarboxylic acids, e.g. decanoic acid, nonanoic acid, octanoic acid, 2-ethylhexanoic acid, heptanoic acid, hexanoic acid, pentanoic acid, 3-methylbutanoic acid, 2-methylpropionic acid, butanoic acid, propionic acid, acrylic acid, methacrylic acid, cyclohexylcarboxylic acid, isophthalic acid, benzoic acid, 4-t-butylbezoic acid, 4-n-butylbenzoic acid, 2-thiophenecarboxylic acid, 3-thiophenecarboxylic acid and mixtures thereof, with MgO, $MgCl_2$ and for $MgSO_4$ and water lead to porous materials with dramatically reduced densities and with high strength. Simple mixers could be used to obtain the above mentioned porous cements. The density of the products could be varied by modulating the experimental conditions to form objects of different properties.

The performance of the different organic acids is not at all the same. For instance, acrylic acid is more efficient in producing foamed oxychloride cement mixtures, while the methacrylic acid is more efficient when using the oxysulfate cement mixtures. Another example is the propionic acid that leads to very fast and efficient results, based on the relative amount of the acid in the mixtures, while n-decanoic acid leads to relatively slower results and less efficient foaming. Yet, the n-decanoic acid gives rise to higher hydrophobic surfaces of the magnesite cements than the propionic acid. The optimization can, naturally, be obtained by mixing various carboxylic acids that are capable of foaming the magnesite cements.

The organic carboxylic acids can be applied in one or more of their common forms: their anhydrides and/or their carboxylate salts, as anyway these compounds turn almost completely into the $Mg^{++}$ carboxylate salts during the preparation of the magnesite cements. Therefore, the use of these three forms of the carboxylic acids is interchangeable. Acid halides can also be used for the same purpose, as they are hydrolyzed quite readily under the production conditions to give the respective carboxylate salts. However, these compounds are usually more expensive than the above mentioned materials and are not expected to be used regularly. Esters and amides are usually hydrolized very slowly under the cements production conditions and therefore can not be used as foaming agents.

The process for making a water-resistant magnesite cement is also a part of the invention.

Naturally, the specified carboxylic acids, their anhydrides and their carboxylate salts (e.g., $Na^+$, $Mg^{++}$, $Ca^{++}$, $Al^{+++}$, etc.), which give rise to foamed products, can also be used in combination with other carboxylic acids, their anhydrides and their carboxylate salts, which do not induce foaming of the product. This combination should lead to foamed magnesite cements with improved water resistance and improved physical strength.

Also, it was found, and this is an object of the present invention, that in the cases in which a polymerizable carboxylic acid(s), like acrylic acid, were used, polymeric forms (i.e. dimers, oligomers and polymers) of the acid formed, in situ, in the production process of the cements. Addition of polymerization-initiators to the mixtures of the cement ingredients and the suitable monomeric acids substantially increases the extent of this phenomenon. As will be shown hereinafter, a complete polymerization of e.g. acrylic acid, can be achieved using $K_2S_2O_8$ as initiator. Analysis of the final foamed product showed no monomeric acrylate molecules The invention is not limited to the use of pure cement formulations. Addition of fillers like sand, clay, calcium based minerals, gravel, aggregates, light aggregates, Acidic Fly-Ash (AFA), graphite, coal and synthetic materials (e.g. Kevlar fibers, Nylon fibers, Alumina, etc.) in suitable forms may further improve the properties of the final product, and allow to meet different economical and physical requirements.

The porous material was also found to be extremely suitable as an adsorbent for gasses and liquids, and for ions, organic and inorganic materials.

It was also found that the white porous material is an excellent adsorbent for cat litter and the like, but the use of this material is not limited to such applications, which are given only by way of example.

The low density of the material of the invention, its physical properties and its low cost make it an excellent light aggregate. There are numerous uses for such a material, as will be appreciated by the skilled person, but they are not listed herein for the sake of brevity.

DETAILED DESCRIPTION OF PREFERRED EMBODIMENTS

The foamable magnesite cement of the invention comprises a cement selected from magnesium oxychloride and magnesium oxysulphate cement, or a mixture thereof, together with one or more organic monocarboxylic acid having a foaming coefficient, as hereinafter defined, lower than 1.80, and/or their anhydrides and/or their carboxylate salts.

Preferably, the carboxylic acids have the formula:

R—COOH wherein

R=Alkyl (linear or branched; saturated or unsaturated; cyclic or acyclic); Aryl (substituted or unsubstituted); containing up to 10 carbon atoms in each of its straight carbon chains; one or more of its carbon or hydrogen atoms may be replaced by oxygen, nitrogen, phosphorous or sulfur atoms.

Preferably, the monocarboxylic acids are chosen from among decanoic acid, nonanoic acid, octanoic acid, 2-ethylhexanoic acid, heptanoic acid, hexanoic acid, pentanoic acid, 3-methylbutanoic acid, 2-methylpropionic acid, butanoic acid, propionic acid, acrylic acid, methacrylic acid, cyclohexylcarboxylic acid, isophthalic acid, benzoic acid, 4-t-butylbezoic acid, 4-n-butylbenzoic acid, 2-thiophenecarboxylic acid, 3-thiophenecarboxylic acid and mixtures thereof.

Acid halides (RCOX; X=Halide; e.g. Cl) can also be used for the same purpose, as they are hydrolyzed quite readily under the production conditions to give the respective carboxylate salts. However, these compounds are usually more expensive than the above mentioned materials and are not expected to be used regularly.

It should be noted that polymerizable carboxylic acid, like acrylic and/or methacrylic acids spontaneously undergo dimerization, oligomerization and/or polymerization, in situ, to some extent, under the production conditions. The addition of suitable polymerization-initiators (e.g. potassium persulfate, sodium perborate, etc.) substantially enhances this phenomenon and under certain conditions no monomeric moiety can be found in the final product. According to this invention, the carboxylic acid may or may not polymerize, or may partially polymerize (namely, part of the monomeric forms are still present in the cements), and when it polymerizes it is dimerized and/or oligomerized and/or polymerized, in situ, during the production of the cements, in the presence or the absence of any added polymerization initiators. By "added" polymerization initiators is meant to indicate effective amounts of such initiators which have been deliberately added, and does not refer to any minor amounts of substances, naturally occurring in the cement components, which may promote some extent of polymerization. It is worthwhile to mention few potential polymerization-initiators (e.g. organic azo compounds and peroxides (for example, hydrogen peroxide) percarboxylates, persulfates, percarbonates and perborates). However, numerous other well known polymerization-initiators will be recognized by the skilled chemist, and are not detailed herein, for the sake of brevity.

According to a preferred embodiment of the invention anhydrides of the carboxylic acids or their salts can be employed, instead of the acid. Examples of illustrative, but non-limitative, salts of the carboxylic acids are the $Na^+$, $Mg^{++}$, $Al^{+++}$  and $Ca^{++}$ salts. Other salts will be recognized by the skilled chemist, and are not detailed herein, for the sake of brevity.

According to another preferred embodiment of the invention, the cement may further comprise also one or more carboxylic acid(s), polycarboxylic acids and/or their anhydrides and/or their salts, which are not capable of inducing foaming. It should be noted that the general definition of the carboxylic acids above (R—COOH) include examples that do not lead to foaming under the conditions tested, like acetic acid, pyruvic acid, lactic acid, 4-hydroxybutyric acid, malic acid, maleic acid, citric acid, and oxalic acid. The ability of any specific carboxylic acid, within the general group of R—COOH mentioned above, to produce foaming, should and can easily be checked by the skilled person in each instance. A simple test based on the "foaming coefficient" hereinafter defined will be described in the "foaming test" in the experimental section. Of course, alternative tests and coefficients representative or corresponding to the foaming coefficient herein defined can be devised by the skilled person, without departing from the spirit of the invention, it being understood that the foaming coefficient is provided as a means easily to determine which carboxylic acids are suitable for carrying out the invention, since carboxylic acids having a foaming coefficient above 1.80 have been found to be unsuitable for the purposes of the invention.

Clearly, different foaming tests could be devised and it will be easy, for skilled persons, to determine when the addition of an acid produces a cement the density of which is significantly lower than that of a comparable cement prepared without the addition of the acid, showing that this latter is "capable of foaming" the cement.

As will be appreciated by the skilled person, the cement of the invention may further comprise conventional additives and/or fillers, which are within the scope of the skilled person. Illustrative examples of such fillers are sand, clay, calcium based minerals, gravel, aggregates, light aggregates, coal, ashes (especially Acidic Fly-Ash) and synthetic materials, i.e. alumina, in suitable forms. The technology of formulating magnesite cements further comprises the addition of additives like phosphoric acid and salts, oily materials like silicons and various polymers (as mentioned in the prior art). It is expected that such additives may also be used in combination with the formulations disclosed in the present application, though it is only optional.

According to a preferred embodiment of the invention, the cement comprises an Acidic Fly-Ash which contains about 35%–55% by weight of $SiO_2$, about 15%–32% of $Al_2O_3$ no more than 15% by weight of CaO, and which has a Loss On Ignition(1000° C.) greater than 2.5 % wt.

The addition of additives like paraffins, polymers, silicone rubbers and other to impart hydrophobic surfaces to the products is also well known in the art, and may well be used in the present invention.

The foamed magnesite in the present invention may be used in ways and applications similar to those mentioned in the literature for other foamed cements, but of course their improved properties will reflect also on its use and improved performance.

The invention is further directed to foamable and hardenable cement according to the invention, and to products made therewith. Such products include, inter alia, formed bodies comprising a cement according to the invention, which has hardened. Such formed bodies include, e.g., cast articles, pelletized articles, structural elements, pressed articles, injected articles, extruded articles, and such articles which have been subsequently crushed.

The invention also encompasses an adsorbent material comprising a cement according to the invention. Adsorbent materials of this type have a variety of uses, and every use of the materials made according to the invention is intended to be covered thereby. Illustrative uses of the adsorbent materials of the invention include, e.g., ion sequestering agents, pet liner, and gas adsorbents. Gas adsorbents are useful for adsorbing a variety of noxious gases, such as $SO_3$ or $SO_2$.

The cements of the invention are also useful as flame retardant compositions. Without wishing to be bound by any particular theory, it is believed that the hydrophobic nature of the materials of the invention improve the surface compatibility of the flame-retardant materials and permit their efficient incorporation in a variety of plastic and other materials.

The foamed cements of the invention are further useful as insulating and packaging materials. In this respect, insulation includes both acoustic and thermal insulation.

All the above and other characteristics and advantages of the invention will better be understood from the following illustrative and non-limitative description of preferred embodiments, with reference to the examples given below.

EXPERIMENTAL

Raw Materials

In the examples given hereinafter, the following raw materials were used:

—Nitrilotriacetic acid ($NTAH_3$) of Aldrich—P3
—E.D.T.A tetra-acid of Aldrich—P4
—Adipic acid of aAldrich—P7
—Acrylic acid of Aldrich—P10
—Methacrylic acid of Aldrich—P14
—Propionic acid of Aldrich—P20
—Hexanoic acid of Aldrich—P40
—2-Methylpropionic acid of Aldrich—P50
—Formic acid of Aldrich
—Acetic acid of Aldrich
—Gluconic acid of Aldrich
—Malic acid of Aldrich
—Oxalic acid of Aldrich
—Citric acid of Aldrich
—Lactic acid of Aldrich
—Methacrylic acid of Aldrich
—n-Butanoic acid of Aldrich
—n-Octanoic acid of Aldrich
—n-Heptanoic acid of Aldrich
—3-Methylbutanoic acid of Aldrich
—n-Nonanoic acid of Aldrich
—n-Decanoic acid of Aldrich
—n-Pentanoic acid of Aldrich
—2-Ethylhexanoic acid of Aldrich
—4-t-Butylbenzoic acid of Aldrich
—Benzoic acid of Aldrich
—4-n-Butylbenzoic acid of Aldrich
—Cyclohexylcarboxylic acid of Aldrich
—Palmitic acid of Aldrich
—Stearic acid of Aldrich
—n-dodecanoic acid of Aldrich
—Polyacrylic acid of Fluka (#81140)
—Ethylene Acrylic Copolymer of Allied Signal (Grade A-C540; Lot #095406AC)
—Sodium dodecylbenzenesulphonate of Aldrich
—Sodium dioctylsulfosuccinate of Cyanamid
—calcined MgO, a product of Dead Sea Periclase ("MgP");
—calcined MgO, a product of Gregician Magnesite;
—grade "Normal F"—"MgF";
—grade "Normal K"—"Mgk";
—$MgSO_4$ solution having a density of d=1.2 g/cm$^3$ were the ratio $H_2O/MgSO_4$=3.1.
—MgCl2 solution having a density of d=1.267–1.27 g/cm$^3$ were the ratio $H_2O/MgCl_2$=2.61.
—Acidic Fly-Ash (AFA) from Hadera power station (contains the major constituents: 50% wt $SiO_2$, 25% wt $Al_2O_3$, 9% wt CaO).
—Quartz sand (−200 Mesh) which contains 99.5% $SiO_2$ It should be noted that the purity of the raw materials that can be used is not of prime importance. A variety of commercially available materials can be used as suitable and inexpensive substitutes.

Preparation and Testing of the Magnesite Cements

The raw materials, in the desired amounts, were introduced in a Retch Mill type KM-1 and subjected to a grinding/mixing operation for a period of 20 minutes. A viscous mass was thus produced, which was introduced in dies of the dimensions 40×40×160 mm and left there to cure for a period of ten days at room temperature. After being cured the cast or pressed bodies were exposed to an accelerated drying/freezing (D/F) cycles for the purpose of evaluating their water resistance and stability. The accelerated D/F cycle included the following stages: a) drying at 80° C. for 24 hours; b) immersion in water for 24 hours; c) freezing of the wet bodies at −18° C. for 24 hours; and d) dropping the cold bodies into boiling water and keeping them therein for 4 hours. The reaction of the bodies to such a treatment reveals their water resistance and stability, resistance to thermal shock, water absorption, weight loss and density changes. The modulus of rupture and compressive strength were measured before and after applying five cycles as hereinbefore described.

The following cement formulations were used:

TABLE I

| Cement Formula. | MgO/ MgCl$_2$ | Additive/ MgCl$_2$ | H$_2$O/ MgCl$_2$ | H$_2$O/ Additive | Type of Additive |
|---|---|---|---|---|---|
| 236 | 2.70 | 4.11 | 2.61 | 0.63 | quartz sand-200 mesh |
| 281 | 2.40 | 4.01 | 2.61 | 0.65 | AFA |
| 310 | 2.40 | 4.01 | 2.61 | 0.65 | quartz sand-200 mesh |
| 337 | 2.40 | 4.01 | 2.61 | 0.65 | Kaolin clay |

EXAMPLE 1

Porous bodies

The cement mixtures listed above and the suitable carboxylic acids were mixed in a laboratory mixer (Retch type KM-1) for 20 mins. The stable foamed material obtained, was casted into dies of the dimensions of 40×40×160 mm and allowed to cure at ambient temperature and pressure for 10 days before testing:

EXAMPLE 2

Semi-Porous Bodies

The cement mixtures listed above and the suitable carboxylic acids were mixed in a laboratory mixer (Retch Type KM-1) for 20 mins. The material, which was obtained, was casted into dies of the dimensions of 40×40×160 mm and allowed to cure at ambient temperature and pressure for 10 days before testing.

TABLE II

| Test No. | Cement Formulation | Cement Based Additive | Type of C.M foaming agent | % of C.M/ MgO | Additional C.M Material | % (C.M/ MgO) | Type of MgO |
|---|---|---|---|---|---|---|---|
| 304 | 236 | quartz sand | P10 | 7% | P7 | 5% | MgP |
| 306 | 281 | AFA | P10 | 5% | P4 | 5% | MgK |
| 316 | 236 | quartz sand 200 mesh | P10 | 5% | P3 | 5% | MgK |
| 318 | 236 | quartz sand 200 mesh | P10 | 5% | P4 | 5% | MgK |
| 325 | 236 | quartz sand 200 mesh | P14 | 10% | — | — | MgF |
| C | 236 | quartz sand 200 mesh | — | — | — | — | MgK |

C.M = Carboxylic Acid Material

The bodies were subjected to the drying/freezing procedure and the following results were obtained:

TABLE III

| Test No. | % W.A. | d g/m$^3$ | CS MPa | MOR MPa |
|---|---|---|---|---|
| 304 | 12.4 | 0.83 | 2.50 | 0.85 |
| 306 | 10.0 | 0.77 | 11.50 | 2.25 |
| 316 | 10.5 | 1.12 | 24.25 | 6.15 |
| 318 | 7.1 | 1.15 | 24.75 | 6.70 |
| 325 | 7.4 | 1.26 | 20.50 | 3.40 | d — Density
CS — Compressive Strength
MOR — Modulus Of Rupture
W.A. — Water Absorption
Note: the results of the last test (test No C) are omitted in the above table as the product deteriorated and cracked after the first D/F cycle.

TABLE IV

| Test No. | Calculated Weight ratio | | | | Type of C.M Material | % of (C.M/ MgO) | Type of MgO |
|---|---|---|---|---|---|---|---|
| | MgO/ MgCl$_2$ | SiO$_2$/ MgCl$_2$ | H$_2$O/ MgCl$_2$ | H$_2$O SiO$_2$ | | | |
| 323 | 2.40 | 4.01 | 2.61 | 0.65 | P10 + P4 | 2%/ 3% | MgP |

C.M = Carboxylic Acid Material

TABLE V

| Test No. | Before D/F cycles | | | | After D/F cycles | | | | |
| --- | --- | --- | --- | --- | --- | --- | --- | --- | --- |
| | % W.A. | d g/m$^3$ | CS MPa | MOR MPa | % W.A. | % W.L. | d g/m$^3$ | CS MPa | MOR MPa |
| 323 | 5.9 | 1.2 | 52.0 | 7.95 | 6.0 | 0 | 1.2 | 53.0 | 8.40 |

W.L. = Weight Loss

EXAMPLE 3

Cat Litter Product

Cat litter materials are light aggregates produced out of natural clays such as attapulgite, sepiolite, etc. The main features exhibited by such products are:
— high liquid absorption
— low bulk density
— absorption of odors from decomposition of urine.

It was found that when acrylic, methacrylic and propionic acids, among other organic carboxylic acids, are added to the modified cement the product tend to foam. In order to demonstrate this particular application, the following tests were conducted.

Procedure
— mixing MgO with brine and carboxylic acid in a laboratory for about 20 minutes;
— drying the resulting wet product overnight at 60° C.;
— crashing and sieving the product into aggregates of −3+0.5 mm size.

Test 1
Raw Materials
— 100 g Calcined MgO—(Mg.F)
— 150 g of MgCl$_2$ brine of density d=1.267 g/cm$^3$.
— 10 g acrylic acid
Product Features
— bulk density, 0.25 g/cm$^3$
— water absorption, 200%
— product color—white
— odor absorption—good Test 2
Raw Materials
— 100 g calcined MgO—(MgK)
— 150 g of MgSO$_4$ brine of density, d=1.2 g/cm$^3$
— 10 g methacrylic acid
Product Features
— bulk density—0.22 g/cm$^3$
— water absorption—180%
— product color—white
— odor absorption—good Test 3
Raw Materials
— 100 g calcined MgO—(MgF)
— 130 g of MgCl$_2$ brine of density, d=1.267 g/cm$^3$
— 20 g MgSO$_4$ brine of density, d=1.2 g/cm$^3$
— 10 g acrylic acid
Product Features
— bulk density—0.30 g/cm$^3$
— water absorption—150%
— product color—white
— odor absorption—good Test 4
Raw Materials
— 100 g calcined MgO—(MgF)
— 150 g of MgCl$_2$ brine of density, d=1.267 g/cm$^3$
— 6 g of propionic acid.
Product Features
— bulk density—0.32 g/cm$^3$
— water absorption—150%
— product color—white
— odor absorption—good

EXAMPLE 4

Adsorption Of Heavy Metals

A solution containing heavy metal ions was prepared by adding salts of Cd, Pb and Cu (i.e. mother solution). Two different types of light aggregates were prepared as follows:

Type 1
— 100 g of MgO type Mg—F.
— 140 g of MgSO$_4$ brine of density d=1.2 g/cm$^3$.
— 12 g of methacrylic acid.

The raw materials were mixed in a Lab. Mixer type Retch KM$^{-1}$ for 20 minutes, then dried overnight at 60° C. and then crushed and sieved into −3+1 mm fractions.

Type 2
— 100 g of MgO type Mg—F.
— 150 g of MgCl$_2$ brine of density d=1.267 g/cm$^3$.
— 10 g of acrylic acid.

The raw materials passed the same process as above in order to produce light aggregates of −3+1 mm fractions.

Activated Carbon: A commercial grade was sieved in order to get a −3+1 mm fraction.

Batch tests

Three beakers containing 200 g of mother solution and 10 g of aggregates type 1, type 2 and activated carbon each, were placed on a magnetic stirrer for 24 hours. Afterwards, the slurries were filtered on filter paper Mn 640 - W. The clean solutions were analyzed by I.C.P. for heavy metals, and the following results were obtained:

TABLE VI

| Heavy metals ppm | Mother solution | Aggregates | | Activated Carbon |
| --- | --- | --- | --- | --- |
| | | Type 1 | Type 2 | |
| Cd | 78 | 1.4 | 2.4 | 0.5 |
| Pb | 5 | n.d | n.d | n.d |
| Cu | 26 | n.d | n.d | 0.2 | n.d. — not detected

Continuous test

Three columns containing aggregates of type 1, type 2 and activated carbon were prepared (of the same mesh, −3+1 mm). 200 g of mother solution were poured into each column and the solution collected below analyzed by the same method of I.C.P. The following results were obtained.

TABLE VII

| Heavy metals | Mother | Aggregates | | Activated |
|---|---|---|---|---|
| ppm | solution | Type 1 | Type 2 | Carbon |
| Cd | 78 | 1.8 | 0.7 | 11.6 |
| Pb | 5 | n.d | n.d | n.d |
| Cu | 26 | n.d | n.d. | 0.1 |

EXAMPLE 5

Several tests were conducted in order to determine the degree of polymerization of acrylic acid during the process of cement manufacturing.

In order to evaluate this phenomena, tests were conducted as follows:

—preparation of cements based on cement formulation No. 236;

—addition of acrylic acid to these cements at 10%(w) with regard to the MgO.

The cements were then cast into dies and cured at room temperature for ten days. Later on, the cements were introduced into dilute HCl water solution (5% w HCl) for seven days. The weight ratio of the cement casted product to dilute HCl was 1:50. The solution was then examined by HPLC in order to evaluate the presence of acrylic acid, with respect to the original content of acrylic acid. Tests were conducted with and without the addition of polymerization initiators. The weight ratio of the initiators to MgO remained a constant value of 5%.

The results are summarized in Table VIII below:

TABLE VIII

| Test No. | Type of additional initiators | Concentration of acrylic with respect to original acrylic acid |
|---|---|---|
| 1 | — | 40% |
| 2 | N.C. | 35% |
| 3 | N.P.B. | 20% |
| 4 | K.P.S. | 0% |

N.C. — sodium percarbonate
N.P.B. — sodium perborate tetrahydrate
K.P.S. — potassium peroxodisulphate.

EXAMPLE 6

"Foaming Coefficient and Test"

Cement mixtures consisting of the following materials: 60 g MgO ("MgF"), 90 g MgCl$_2$ brine, 50 g quartz sand and the 3.0 g of the organic carboxylic acid being tested, are mixed in a laboratory mixer (Retch type KM—=1) for 10 mins.. The mixtures obtained are cast into dies of the dimensions 20×20×70 mm and allowed to cure at room temperature and pressure for 10 days. The specimens are dried at 80° C. for 15 hrs. and then their densities are measured. The results are given in Table IX:

TABLE IX

| Test # | Carboxylic Acid | Density(g/cm$^3$) | Notes |
|---|---|---|---|
| 9 | None | 1.95 | Reference |
| 10 | Stearic | >1.85 | Non-Foaming |
| 11 | Palmitic | >1.85 | Non-Foaming |
| 12 | Dodecanoic | >1.85 | Non-Foaming |
| 13 | Formic | 1.92 | Non-Foaming |
| 14 | Acetic | 1.94 | Non-Foaming |
| 15 | E.D.T.A | 1.93 | Non-Foaming |
| 16 | Gluconic | 1.95 | Non-Foaming |
| 17 | Malic | 1.94 | Non-Foaming |
| 18 | Oxalic | 1.92 | Non-Foaming |
| 19 | Citric | 1.93 | Non-Foaming |
| 20 | Lactic | 1.89 | Non-Foaming |
| 21 | Polyacrylic | 1.92 | Non-Foaming |
| 22 | Ethylene Acrylic Copolymer | 1.94 | Non-Foaming |
| 23 | Acrylic | 0.95 | Foaming |
| 24 | Methacrylic | 0.99 | Foaming |
| 25 | Propionic | 0.82 | Foaming |
| 26 | n-Butanoic | 1.15 | Foaming |
| 27 | n-Hexanoic | 1.23 | Foaming |
| 28 | 2-Methylpropionic | 1.18 | Foaming |
| 28 | n-Octanoic | 1.27 | Foaming |
| 29 | n-Heptanoic | 1.30 | Foaming |
| 30 | 3-Methylbutanoic | 1.40 | Foaming |
| 31 | n-Nonanoic | 1.39 | Foaming |
| 32 | n-Decanoic | 1.45 | Foaming |
| 33 | n-Pentanoic | 0.93 | Foaming |
| 34 | 2-Ethylhexanoic | 1.28 | Foaming |
| 35 | 4-t-Butylbenzoic | 1.12 | Foaming |
| 36 | Benzoic | 0.99 | Foaming |
| 37 | 4-n-Butylbenzoic | 1.32 | Foaming |
| 38 | Cyclohexylcarboxylic | 0.88 | Foaming |

Note 1: A carboxylic acid is considered operative for the present invention if it has a foaming coefficient lower than 1.80. The "foaming coefficient" is defined as the density of the magnesite cement produced according to the procedure described above, in 1.80 g/cm$^3$.
Note 2: Sodium dodecylbenzenesulphonate and sodium dioctylsulfosuccinte gave rise to cements of >1.85 g/cm$^3$ when tested under the above conditions.

All the above description and examples have been provided for the purpose of illustration, it being understood that they are not intended to limit the scope of the invention in any way, except as claimed in the appended claims.

I claim:

1. A process for making a foamed magnesite cement, comprising the step of mixing:

(a) water;

(b) magnesium oxide;

(c) a magnesium salt selected from the group consisting of magnesium chloride and magnesium sulfate; and (d) an organic compound selected from the group consisting of monocarboxylic acids having a foaming coefficient lower than about 1.8, anhydrides of said monocarboxylic acids, and salts of said monocarboxylic acids;

thereby producing a foaming magnesite cement mixture.

2. The process of claim 1, wherein said monocarboxylic acid has the formula

R—COOH wherein R is selected from the group consisting of linear saturated alkyl having up to ten carbon atoms, linear unsaturated alkyl having up to ten carbon atoms, branched saturated alkyl having up to ten carbon atoms in the longest branch thereof, branched unsaturated alkyl having up to ten carbon atoms in the longest branch thereof, cyclic unsubstituted saturated alkyl, cyclic substituted saturated alkyl wherein the longest branch of said at least one substituent has at most ten carbon atoms, cyclic unsubstituted unsaturated alkyl, cyclic substituted unsaturated alkyl wherein the longest branch of said at least one substituent has at most ten carbon atoms, unsubstituted aryl, and substituted aryl wherein the longest branch of said at least one substituent has at most ten carbon atoms.

3. The process of claim 2, wherein said monocarboxylic acid is selected from the group consisting of decanoic acid, nonanoic acid, octanoic acid, 2-ethylhexanoic acid, heptanoic acid, hexanoic acid, pentanoic acid, 3-methylbutanoic acid, 2-methylpropanoic acid, butanoic acid, propionic acid, acrylic acid, methacrylic acid, cyclohexylcarboxylic acid, benzoic acid, 4-t-butylbenzoic acid, and 4-n-butylbenzoic acid.

4. The process of claim 2, wherein at least one atom of said R, selected from the group consisting of carbon and hydrogen, is replaced by at least one atom selected from the group consisting of oxygen, nitrogen, phosphorus, and sulfur.

5. The process of claim 4, wherein said monocarboxylic acid is selected from the group consisting of 2-thiophenecarboxylic acid and 3-thiophenecarboxylic acid.

6. The process of claim 1, wherein said salts are selected from the group consisting of $Na^+$ salts, $Mg^{+2}$ salts, $Al^{+3}$ salts, and $Ca^{+2}$ salts.

7. The process of claim 1, further comprising the step of adding to said mixture an organic compound selected from the group consisting of carboxylic acids having a foaming coefficient at least as great as about 1.8, anhydrides of said carboxylic acids, and salts of said carboxylic acids.

8. The process of claim 1, further comprising the step of adding to said mixture a filler selected from the group consisting of sand, clay, activated carbon, coal, ash, acidic fly ash, and synthetic materials.

9. The process of claim 8, wherein said filler is acidic fly ash.

10. The process of claim 9, wherein said acidic fly ash contains:

(a) between about 35% and about 55% $SiO_2$ by weight;

(b) between about 15% and about 32% $Al_2O_3$ by weight; and (c) at most 15% CaO by weight;

and wherein said acidic fly ash has a loss on ignition at 1000° C. greater than 2.5% by weight.

11. The process of claim 8, wherein said synthetic materials are selected from the group consisting of Kevlar fibers, polyester fibers, fiberglass, and alumina.

12. The process of claim 1, further comprising the step of adding to said mixture an additive selected from the group consisting of long chain fatty acid esters, paraffins, polymer greases, and silicone rubbers.

13. The process of claim 1, further comprising the step of adding to said mixture an amount of polymerization initiator effective to initiate polymerization.

14. The process of claim 13, wherein said polymerization initiator is selected from the group consisting of organic azo compounds, organic peroxide compounds, hydrogen peroxide, percarboxylates, persulfates, percarbonates, and perborates.

15. A foamed body comprising a magnesite cement made by the process of claim 1.

16. A foamed body according claim 15 which is a cast article.

17. A foamed body according to claim 15 in pelletized form.

18. A foamed body according to claim 15 which is a pressed article.

19. A foamed body according to claim 15 which is an injected article.

20. A foamed body according to claim 15 which is an extruded article.

21. An absorbent material comprising a magnesite cement made by the process of claim 1.

22. The absorbent material according to claim 21, for use as a pet litter.

23. The absorbent material according to claim 21, for use as a gas absorbent.

24. The absorbent material of claim 23, wherein said gas is selected from the group consisting of $SO_3$ and $SO_2$.

25. A flame retardant composition comprising a magnesite cement made by the process of claim 1.

26. An insulating material comprising a magnesite cement made by the process of claim 1.

27. The insulating material of claim 26, for use as an acoustic insulating material.

28. The insulating material of claim 26, for use as a thermal insulating material.

29. A packaging material comprising a magnesite cement made by the process of claim 1.

30. A foamed magnesite cement, comprising:

(a) a cement selected from the group consisting of magnesium oxychloride cement and magnesium oxysulfate cement; and (b) an organic compound selected from the group consisting of monocarboxylic acids having a foaming coefficient lower than about 1.8, anhydrides of said monocarboxylic acids, and salts of said monocarboxylic acids.

31. The cement of claim 30, wherein said monocarboxylic acid has the formula

R—COOH wherein R is selected from the group consisting of linear saturated alkyl having up to ten carbon atoms, linear unsaturated alkyl having up to ten carbon atoms, branched saturated alkyl having up to ten carbon atoms in the longest branch thereof, branched unsaturated alkyl having up to ten carbon atoms in the longest branch thereof, cyclic unsubstituted saturated alkyl, cyclic substituted saturated alkyl wherein the longest branch of said at least one substituent has at most ten carbon atoms, cyclic unsubstituted unsaturated alkyl, cyclic substituted unsaturated alkyl wherein the longest branch of said at least one substituent has at most ten carbon atoms, unsubstituted aryl, and substituted aryl wherein the longest branch of said at least one substituent has at most ten carbon atoms.

32. The cement of claim 31, wherein said monocarboxylic acid is selected from the group consisting of decanoic acid, nonanoic acid, octanoic acid, 2-ethylhexanoic acid, heptanoic acid, hexanoic acid, pentanoic acid, 3-methylbutanoic acid, 2-methylpropanoic acid, butanoic acid, propionic acid, acrylic acid, methacrylic acid, cyclohexylcarboxylic acid, benzoic acid, 4-t-butylbenzoic acid, and 4-n-butylbenzoic acid.

33. The cement of claim 31, wherein at least one atom of said R, selected from the group consisting of carbon and hydrogen, is replaced by at least one atom selected from the group consisting of oxygen, nitrogen, phosphorus, and sulfur.

34. The cement of claim 33, wherein said monocarboxylic acid is selected from the group consisting of 2-thiophenecarboxylic acid and 3-thiophenecarboxylic acid.

35. The cement of claim 30, wherein said salts are selected from the group consisting of Na$^+$ salts, Mg$^{+2}$ salts, Al$^{+3}$ salts, and Ca$^{+2}$ salts.

36. The cement of claim 30, further comprising an organic compound selected from the group consisting of carboxylic acids having a foaming coefficient at least as great as about 1.8, anhydrides of said carboxylic acids, and salts of said carboxylic acids.

37. The cement of claim 30, further comprising a filler selected from the group consisting of sand, clay, activated carbon, coal, ash, acidic fly ash, and synthetic materials.

38. The cement of claim 37, wherein said filler is acidic fly ash.

39. The cement of claim 38, wherein said acidic fly ash contains:

(a) between about 35% and about 55% SiO$_2$ by weight;

(b) between about 15% and about 32% Al$_2$O$_3$ by weight; and (c) at most 15% CaO by weight;

and wherein said acidic fly ash has a loss on ignition at 1000° C. greater than 2.5% by weight.

40. The cement of claim 37, wherein said synthetic materials are selected from the group consisting of Kevlar fibers, polyester fibers, fiberglass, and alumina.

41. The cement of claim 30, further comprising an additive selected from the group consisting of long chain fatty acid esters, paraffins, polymer greases, and silicone rubbers.

* * * * *